US005899644A

United States Patent [19]

Buck et al.

[11] Patent Number: 5,899,644

[45] Date of Patent: May 4, 1999

[54] APPARATUS FOR SUPPORTING A HAND GUIDED DRILL TOOL

[75] Inventors: Manfred Buck, Nuertingen; Thomas Dahler, Filderstadt; Helmut Kratt, Spaichingen, all of Germany

[73] Assignee: Robert Bosch GmbH, Stuttgart, Germany

[21] Appl. No.: 09/025,025

[22] Filed: Feb. 17, 1998

[30] Foreign Application Priority Data

Feb. 28, 1997 [DE] Germany ....................... 297 03 685 U

[51] Int. Cl.$^{6}$ ...................................................... B23B 39/00

[52] U.S. Cl. .............................. 408/97; 408/110; 408/712

[58] Field of Search .............................. 408/97, 112, 712, 408/110

[56] References Cited

U.S. PATENT DOCUMENTS

| | | | |
|---|---|---|---|
| 1,590,643 | 6/1926 | Neuwelt | 408/112 |
| 2,392,070 | 1/1946 | Snyder | 408/712 |
| 3,746,460 | 7/1973 | Lipe | 408/112 |
| 3,864,053 | 2/1975 | Harwood | 408/110 |
| 4,594,035 | 6/1986 | Hoyss et al. | 408/712 |
| 4,810,137 | 3/1989 | Yang | 408/112 |
| 4,923,341 | 5/1990 | Cameron | 408/112 |
| 5,006,022 | 4/1991 | Miller | 408/712 |
| 5,342,153 | 8/1994 | Dobkins | 408/712 |
| 5,370,481 | 12/1994 | Altmann et al. | 408/129 |

*Primary Examiner*—Andrea L. Pitts
*Assistant Examiner*—Adesh Bhargava
*Attorney, Agent, or Firm*—Michael J. Striker

[57] ABSTRACT

A support apparatus for a hand guided drill tool, especially a drill tool having diamond cutting elements, is provided. The support apparatus includes a movable support arm having at its free end a stand off piece for receiving and guiding a drill bit relative to a surface to be drilled. The movable support arm is telescopically movably mounted to a base element which has a travel stop member for engaging the support arm to prevent further extension thereof beyond its fully extended position. A damping element comprised of two plate shaped elastomeric portions is mounted on the support arm to damp the engagement of the support arm by the travel stop member and thereby avoid undesirable damage and collision noises.

9 Claims, 4 Drawing Sheets

APPARATUS FOR SUPPORTING A HAND GUIDED DRILL TOOL

BACKGROUND OF THE INVENTION

The present invention relates to an apparatus for supporting a hand guided drill tool, especially a drill tool having diamond cutting elements.

The initial drilling process is especially critical during a hand guided drilling operation. As a result of a deficient guiding of the drill cutting element into the drilled hole, the drill cutting element may work itself out of the hole due to the rotation of the tip of the drill cutting element. Damage to the outer surface of the piece being drilled is thus unavoidable. For this reason, it is preferred to use a support element, which is also known as an initial drilling aide, for the initial drilling process. The support element is intended to provide additional assistance in standing off the drill tool from the outer surface of the piece to be drilled. Moreover, such support elements serve as holders for a retaining ring for cooling or lubrication medium during wet drilling processes.

It is known to use support elements which are attachable to drill tools and which have, at the drill cutting element location, a stand off receiving member for concentrically receiving and surrounding the drill cutting element to support the drill tool relative to the outer surface to be drilled. Such known support elements include one or two spring biased retractable support arms which, in their fully extended position from a base support element spaced from the outer surface, are pressed against a travel limit member under the action of the spring bias. Such support elements are disadvantageous in that the retractable support arms periodically hit hard against the travel limit member while returning to their extended positions. The danger thus arises that constituent elements of the support element will be damaged with the support element consequently not suited for further use. Additionally, undesired collision noises are produced.

SUMMARY OF THE INVENTION

The support apparatus of the present invention has, according to the one aspect thereof, the advantage that damage to constituent parts of the support apparatus and collision noise resulting from reaching the fully extended end position of the support arm can be avoided.

Further advantages are provided by other aspects of the support apparatus of the present invention. For example, the base element is preferably configured to movably support the movable support arm therein for telescoping movement thereof and the travel stop member is secured to the base element. In another aspect of the present invention, the damping element includes two plate shaped elastomeric portions and each portion is received in a corresponding recess on the base element as the movable support arm reaches its fully extended position.

DETAILED DESCRIPTION OF THE PREFERRED EMBODIMENT

Figure 1:
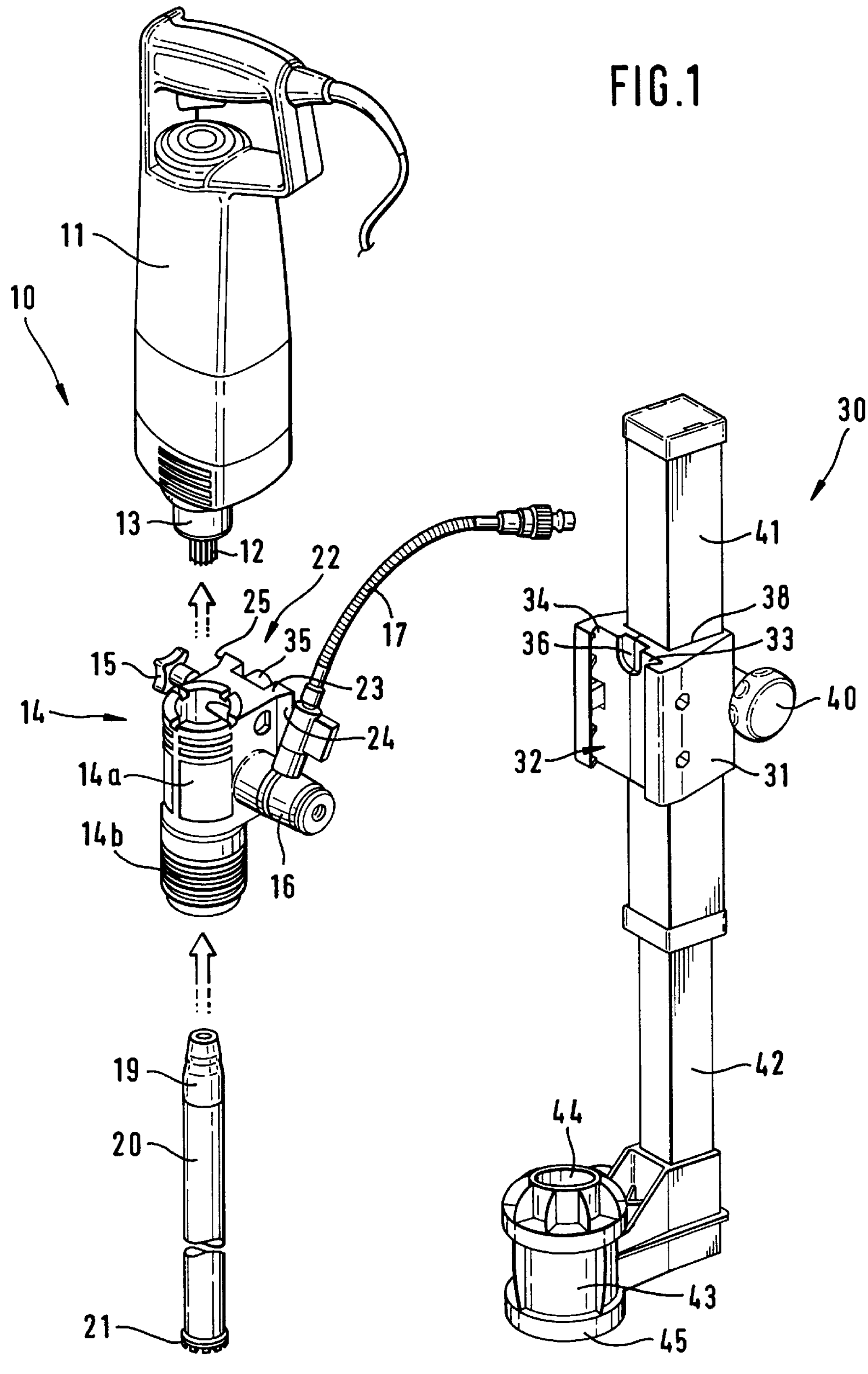
FIG. 1 is an exploded perspective view of a drill tool and the preferred embodiment of the support apparatus of the present invention.

As seen in FIG. 1, a drill tool assembly 10 includes a drill tool 11 which has a gripping collar 13 from which extends a drill bit 12. A cleaning head 14 is mountable on the drill tool 11 by means of a securement element having a threaded grip 15 and securable to the gripping collar 13. The cleaning head 14 includes a housing **14*a* forming a drill bit receiving portion 14*b* and a connection support 16 for connecting a delivery hose 17** to the cleaning head such that cooling water can be delivered thereto.

A shaft 19 of a drill crown 20 is axially disposed in the receiving portion **14*b* and the free end of the shaft has a cutter 21. The cutter 21** includes a hard metal or diamond outfitted cutting body.

An attachment plate 23 is also formed on the cleaning head 14 and includes side guides 24, 25. The attachment plate 23, together with its side guides 24, 25, forms a tongue 22 of a tongue and groove attachment arrangement and the tongue 22 can be secured to a support apparatus 30 of the drill tool assembly 10 or alternately secured to a stationary drill tool support (not shown).

The support apparatus 30 includes a carriage 31 for receiving and securing a drill tool and the carriage 31 includes a groove 32 of the tongue and groove attachment arrangement which comprises the tongue 22 of the attachment plate 23. Accordingly, the side guides 24, 25 of the tongue 22 are received in respective corresponding guide grooves 33, 34 of the groove 32 such that the tongue 22 can be inserted from above into the groove 32 until a stop bolt 35 on the tongue is seated in a stop recess 36 on the carriage 31.

The carriage 31 includes a channel 38 in which a base or receiving element 41 is insertable. The base element 41 is securable to the carriage 31 by a securement member having a turn grip adjustment 40. The base element 41 is configured as a pipe of right angled parallelepiped cross-section and is comprised, for example, of aluminum. A support arm 42, which is likewise configured as a hollow pipe of right angled parallelepiped cross-section, is telescopically movably retained in the base element 41.

A stand off piece 43 is mounted at the free end of the support arm 42 and includes a through opening 44 coaxial with the drill crown 20 and operable to guide the drill crown inserted therethrough. The stand off piece 43 includes a spacing edge or alternately an attachment edge for respectively spacing the surface to be drilled from the support arm 42 or attaching the surface to be drilled and the support arm 42 to one another.

Thus, the support appratus of the present invention provides a movable support arm 42 having a drill bit guiding portion in the form of the stand off piece 43 for guiding a bit of a drill tool 11 with the support arm 42 being movably coupled to the base element 41 for movement between a fully extended position in which the drill bit guiding portion in the form of the stand off piece 43 is at a fully extended spacing relative to the base element 41 and a retracted position in which the drill bit guiding portion is at a retracted spacing relative to the base element 41 less than the fully extended spacing.

Figure 2:
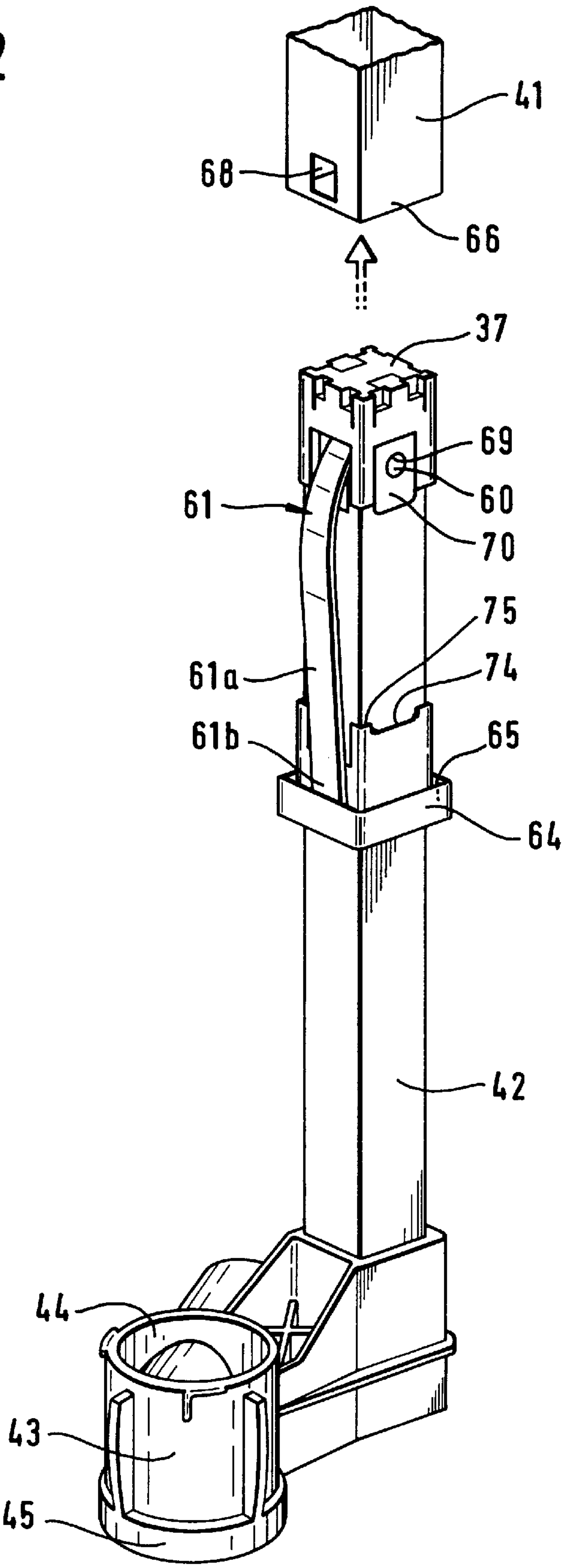
FIG. 2 is a perspective view of a portion of the support apparatus shown in FIG. 1 and showing the support arm thereof in an extended position and the base element in exploded assembly view.
Figure 3:
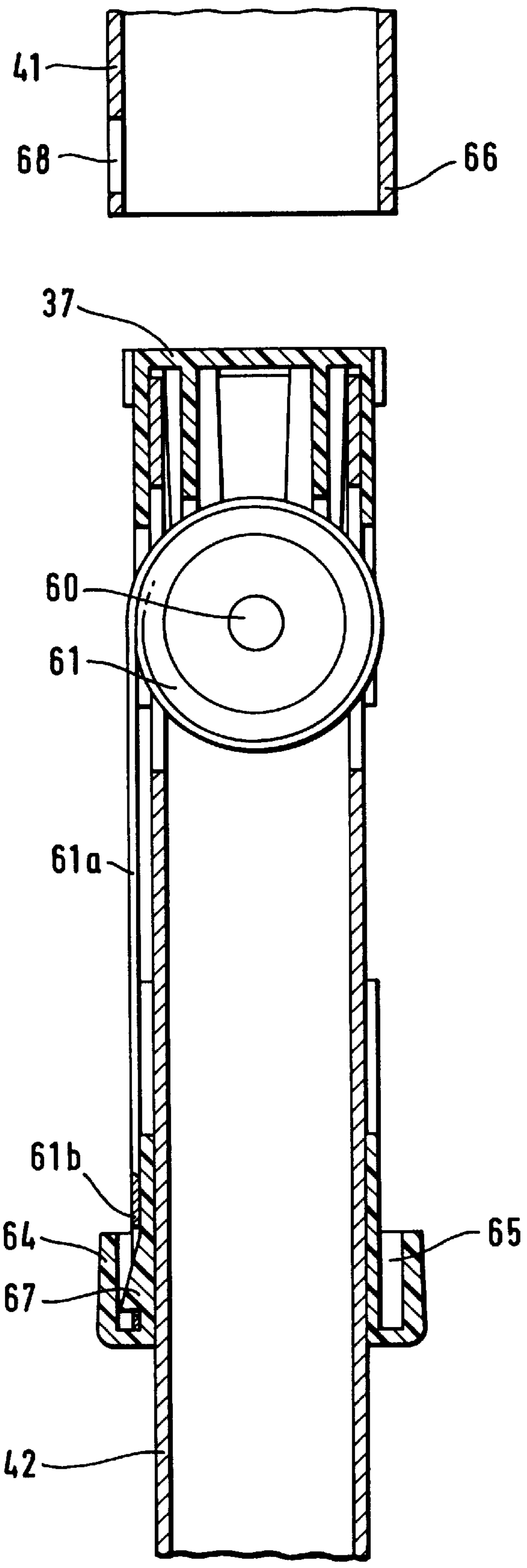
FIG. 3 is an enlarged vertical sectional view of a portion of the support apparatus portion shown in FIG. 2.

The support arm 42 is shown in FIGS. 2 and 3 in an extended position in which its free end is extended relative to the base element 41. A bolt 60 is disposed on the support arm 42 and the inner end of a coiled-type spring 61 is secured to the bolt 60. The bolt 60 is retained via a cap 37 which surrounds and is secured to the end of the support arm 42 opposite its free end. The spring 61 comprises a spiral shaped coiled spring tape 61*a*. An extendable end 61*b* of the spring 61 is secured to a guide piece 64 which is axially guidable along the support arm 42 and which includes a receiving rim 65 for receiving therewithin a forward edge 66 of the base element 41.

As seen in FIG. 3, a snap projection 67 is disposed inwardly of the receiving rim 65 for snap locking into an aperture 68 on the base element 41. The snap engagement of the snap projection 67 in the aperture 68 also serves to secure the extendable end 61*b* of the spring 61 to the guide piece 64. The base element 41 is thus together with the guide piece 64 movable relative to the support arm 42 whereby the end of the support arm 42 on which the cap 37 is secured is continuously secured in the base element 41.

The spring 61 is configured to be self coiling and it thus pulls its extendable end 61*b* in the direction of the bolt 60. Since the guide piece 64 is secured to the base element 41 via the engagement of the snap clip 67 in the aperture 68, the support arm 42 is continuously urged by the spring 61 to move relative to the base element 41 toward its fully extended position. To enhance this operation, a damping element 70 is provided for dampingly limiting further extending movement of the support arm 42 as the arm reaches its fully extended position. The damping element 70 is secured to the bolt 60 and disposed between the cap 37 and the guide piece 64 and is comprised, for example, of an elastomeric material. In the event that the support apparatus 30 is pressed against a surface to be drilled, the support apparatus shortens due to the retracting movement of the support arm 42 into the base element 41 against the bias of the spring 61.

Figure 4:
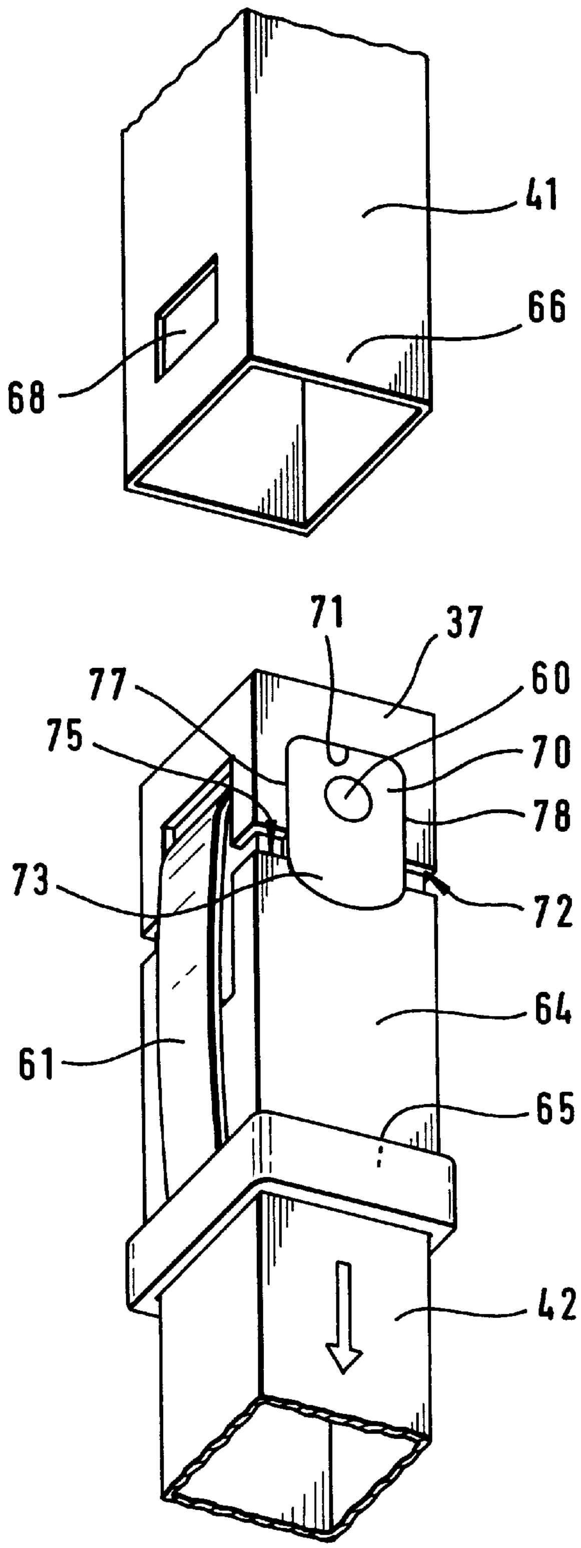
FIG. 4 is an enlarged perspective view of the support arm of the support apparatus in its fully extended position and of the base element in exploded assembly view.

The support arm 42 is shown in FIG. 4 in its fully extended position. In this position, the spring 61 is maximally extended against its self coiling bias and a rear wall 75 of the guide piece 64 which faces the base element 41 is engaged by the damping element 70 whereby a further extension of the spring 61 is prevented. The rear wall 75 thus forms a travel stop for the support arm 42.

The damping element 70 is preferably formed of two plate shaped portions disposed on opposing sides of the support arm 42 and which include an attachment hole 69 through which the bolt 60 projects. Each plate shaped portion of the damping element 70 is received in a generally U-shaped recess 71 on a side wall of the cap 37 and each portion extends beyond a forward side 72 of the cap 37. The side surfaces 77, 78 of the portions of the damping element 70 are disposed on the shanks of the recess 71. The extending over piece 73 of each damping element portion is received in a correspondingly configured recess 74 in the facing rear wall 75 of the guide piece 64. The rear wall 72 of the cap 37 forms a corresponding counter contact surface which faces the rear wall 75. The receipt of the damping element portions into the recesses 74 of the guide piece 64 serves to maintain the wall 72 of the cap 37 and the facing wall 75 of the guide piece 64 at a spacing from one another. In correspondence with the material properties of the damping element 70 such as, for example, hardness, and additionally in correspondence with the shape of the damping element, a collision between the wall 72 of the cap 37 and the facing wall 75 of the guide piece 64 can be either fully prevented or merely dampened.

We claim:

1. An apparatus for supporting a hand guided drill tool relative to a surface to be drilled, comprising: a base element; a movable support arm having a drill bit guiding portion for guiding a bit of a drill tool, the movable support arm being movably coupled to the base element for movement between a fully extended position in which the drill bit guiding portion is at a fully extended spacing relative to the base element and a retracted position in which the drill bit guiding portion is at a retracted spacing relative to the base element less than the fully extended spacing; means for biasing the movable support arm toward its fully extended position; a travel stop member on a selected one of the base element and the movable support arm; and a damping means on the other of the base element and the movable support arm for engaging the travel stop member and arranged to dampingly limit further extending movement of the movable support arm beyond its fully extended position.

2. An apparatus according to claim 1 wherein the base element is configured to movably support the movable support arm therein for telescoping movement thereof and the travel stop member is secured to the base element.

3. An apparatus according to claim 2 wherein the base element includes an end orientable toward the surface to be drilled and the base element includes a guide piece secured to its surface orientable end and having a wall forming the travel stop member.

4. An apparatus for supporting a hand guided drill tool relative to a surface to be drilled, comprising: a base element; a movable support arm having a drill bit guiding portion for guiding a bit of a drill tool, the movable support arm being movably coupled to the base element for movement between a fully extended position in which the drill bit guiding portion is at a fully extended spacing relative to the base element and a retracted position in which the drill bit guiding portion is at a retracted spacing relative to the base element less than the fully extended spacing; means for biasing the movable support arm toward its fully extended position; a travel stop member on a selected one of the base element and the movable support arm; and a damping means on the other of the base element and the movable support arm for engaging the travel stop member to dampingly limit further extending movement of the movable support arm beyond its fully extended position, the base element including an end orientable toward the surface to be drilled and the base element including a guide piece secured to its surface orientable end and having a wall forming the travel stop member, an end of the movable support arm being received in the base element and the movable support arm including a cap on its said end having a wall operable as a corresponding counter contact surface to the guide piece wall forming the travel stop member.

5. An apparatus according to claim 4 and further comprising a bolt for securing the cap and the damping element to the movable support arm.

6. An apparatus according to claim 4 wherein the cap includes a recess for receiving the damping element therein and the damping element extends beyond the surface facing side of the cap.

7. An apparatus according to claim 6 wherein the guide piece includes a recess for receipt therein of the damping element in the fully extended position of the movable support arm.

8. An apparatus for supporting a hand guided drill tool relative to a surface to be drilled, comprising: a base element; a movable support arm having a drill bit guiding portion for guiding a bit of a drill tool, the movable support arm being movably coupled to the base element for movement between a fully extended position in which the drill bit guiding portion is at a fully extended spacing relative to the base element and a retracted position in which the drill bit guiding portion is at a retracted spacing relative to the base element less than the fully extended spacing; means for biasing the movable support arm toward its fully extended position; a travel stop member on a selected one of the base element and the movable support arm; and a damping means on the other of the base element and the movable support arm for engaging the travel stop member to dampingly limit further extending movement of the movable support arm beyond its fully extended position, the damping element being plate shaped.

9. An apparatus according to claim 8 wherein the damping element includes two plate shaped portions mounted to the movable support arm on opposite sides thereof.

* * * * *